US009889730B2

(12) United States Patent
Chung et al.

(10) Patent No.: US 9,889,730 B2
(45) Date of Patent: Feb. 13, 2018

(54) WATER MANAGEMENT FOR VEHICLES WITH TONNEAU COVERS

(71) Applicant: Toyota Motor Engineering & Manufacturing North America, Inc., Erlanger, KY (US)

(72) Inventors: James J. Chung, Milan, MI (US); Keith O'Brien, Highland, MI (US); Myron D. Bowers, Perrysburg, OH (US); Scott L. Frederick, Brighton, MI (US); Matthew A. Jansma, Saline, MI (US)

(73) Assignee: Toyota Motor Engineering & Manufacturing North America, Inc., Erlanger, KY (US)

( * ) Notice: Subject to any disclaimer, the term of this patent is extended or adjusted under 35 U.S.C. 154(b) by 87 days.

(21) Appl. No.: 14/942,616

(22) Filed: Nov. 16, 2015

(65) Prior Publication Data

US 2017/0136862 A1    May 18, 2017

(51) Int. Cl.
*B60J 10/90* (2016.01)
*B60P 7/02* (2006.01)
*B60J 10/25* (2016.01)

(52) U.S. Cl.
CPC ............ *B60J 10/90* (2016.02); *B60J 10/25* (2016.02); *B60P 7/02* (2013.01)

(58) Field of Classification Search
CPC ............ B60P 7/02; B60J 10/90; B60J 10/25
See application file for complete search history.

(56) References Cited

U.S. PATENT DOCUMENTS

| 5,105,580 A | 4/1992 | Akachi et al. |
| 6,126,226 A | 10/2000 | Wheatley |
| 7,093,891 B2 | 8/2006 | Gervasi |
| 7,537,264 B2 * | 5/2009 | Maimin ............... B60J 7/141 296/100.06 |

FOREIGN PATENT DOCUMENTS

EP    1512571 A1    3/2005

* cited by examiner

*Primary Examiner* — D Glenn Dayoan
*Assistant Examiner* — Melissa A Black
(74) *Attorney, Agent, or Firm* — Christopher G. Darrow; Darrow Mustafa PC (57) ABSTRACT

Water management for vehicles with an open top cargo bed are described. A plurality of vehicle components can form a portion of the open-top cargo bed. The plurality of vehicle components can define a gap. A seal plug can be received in the gap. The seal plug can sealingly engage the first and/or second lateral side of the gap. The seal plug can be configured to direct water away from the vehicle. For instance, the seal plug can include a deflection surface. The deflection surface can be angled downwardly and away from the gap. The seal plug can include a water drainage channel. The water drainage channel can include a first end opening to an upper surface of the seal plug and the second end opening to the deflection surface and/or other surface that slopes downwardly and away from the gap.

20 Claims, 6 Drawing Sheets

WATER MANAGEMENT FOR VEHICLES WITH TONNEAU COVERS

FIELD

The subject matter described herein relates in general to vehicles and, more particularly, to vehicles that include an open top cargo bed.

BACKGROUND

Pick-up trucks and other motor vehicles can include an open-topped bed for carrying various cargo. The bed can be covered to minimize the infiltration of dirt, debris, and/or other unwanted items into the bed and to protect cargo located in the bed. For instance, the bed can be covered by a tonneau cover. The tonneau cover can also improve the aesthetic appearance of the vehicle. The tonneau cover can be selectively attached to and detached from the vehicle. Various types of tonneau covers are available, including hard-top types and soft-top types. Hard-top type tonneau covers have a rigid cover portion typically constructed of metal, fiberglass or the like. Soft-top type tonneau covers have a soft cover portion typically constructed of canvas, vinyl or a weather-resistant fabric.

SUMMARY

In one respect, the subject matter described herein is directed to a seal plug. The seal plug includes a body. The body can have an upper side. The upper side can include a first surface that transitions to a second surface. The second surface can be angled downwardly relative to the first surface. The body can include a lower side. The lower side can be located on an opposite side of the body from the upper side.

The body can include a first lateral side. The first lateral side can include one or more sealing surfaces configured to sealingly engage one or more vehicle components. The body can include a second lateral side. The second lateral side can be located on an opposite side of the body from the first lateral side. The second lateral side can include one or more sealing surfaces configured to sealingly engage one or more vehicle components.

The body can include a deflector. The deflector can define at least a portion of an outer side of the body. The deflector can include a deflection surface. The deflection surface can be angled downwardly relative to the first surface.

The body can include upper tab. The upper tab can extend above the first surface in an elevation direction. A water drainage channel can be defined in an inner side of the upper tab. The water drainage channel can include a first end and a second end. The first end can open to an upper surface of the upper tab, and the second end can open to the second surface and/or the deflection surface.

In another respect, the subject matter described herein is directed to a water management system for a vehicle. The system can include a plurality of vehicle components. The plurality of vehicle components can form a portion of an open-top cargo bed of a vehicle. The plurality of vehicle components can define a gap. The gap can include at least a first lateral side, a second lateral side, and a bottom side. The first lateral side can be opposite the second lateral side.

The system can include a seal plug. The seal plug can be received in the gap. The seal plug can sealingly engage the first lateral side and the second lateral side of the gap. The seal plug can be supported on the bottom side of the gap. The seal plug can include an upper side. The upper side can include a first surface that transitions to a second surface. The second surface can be angled downwardly relative to the first surface. The second surface can be angled downwardly away from the gap.

The seal plug can include a deflection surface. The deflection surface can be angled downwardly and away from the first surface and from the plurality of vehicle components. The seal plug can include an upper tab. The upper tab can extend above the first surface in an elevation direction. A water drainage channel can be defined in an inner side of the upper tab. The water drainage channel can include a first end and a second end. The first end can open to an upper surface of the upper tab. The second end can open to at least one of the second surface and the deflection surface.

DETAILED DESCRIPTION

This detailed description relates to vehicles that include an open top cargo bed. This detailed description is more particularly related to water management for such vehicles. A seal plug can be received in a gap defined by a plurality of vehicle components, which form a portion of an open-top cargo bed of a vehicle. The seal plug can physically fill in at least a substantial portion of the gap. The seal plug can sealingly engage one or more sides of the gap. The seal plug can include one or more features to direct water away from the vehicle. The seal plug can include one or more surfaces that are angled downwardly and away from the vehicle. The seal plug can include a water drainage channel. The water drainage channel can include a first end and a second end. The first end can open to an upper surface of the seal plug, and the second end can open to at least one of the one or more surfaces that are angled downwardly and away from the vehicle. The present detailed description relates to apparatus and/or systems that incorporate one or more of such features. In at least some instances, arrangements described herein can minimize the infiltration of water, dirt, and/or other substances into the bed of the vehicle. Arrangements described herein can do so by sealing against one or more vehicle structures and/or by facilitating the drainage of water away from the vehicle.

Detailed embodiments are disclosed herein; however, it is to be understood that the disclosed embodiments are intended only as examples. Therefore, specific structural and functional details disclosed herein are not to be interpreted as limiting, but merely as a basis for the claims and as a representative basis for teaching one skilled in the art to variously employ the aspects herein in virtually any appropriately detailed structure. Further, the terms and phrases used herein are not intended to be limiting but rather to provide an understandable description of possible implementations. Various embodiments are shown in FIGS. 1-11, but the embodiments are not limited to the illustrated structure or application.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details.

Arrangements described herein are described in connection with managing water infiltration into a vehicle cargo bed, it will be understood that arrangements described herein can be used with respect to any fluid, liquid, or other substance to which a vehicle may be exposed. For instance, water management systems described herein can be used to minimize the infiltration of dirt, debris, cleaning fluids, and/or other substances and things into a cargo bed.

Figure 1:
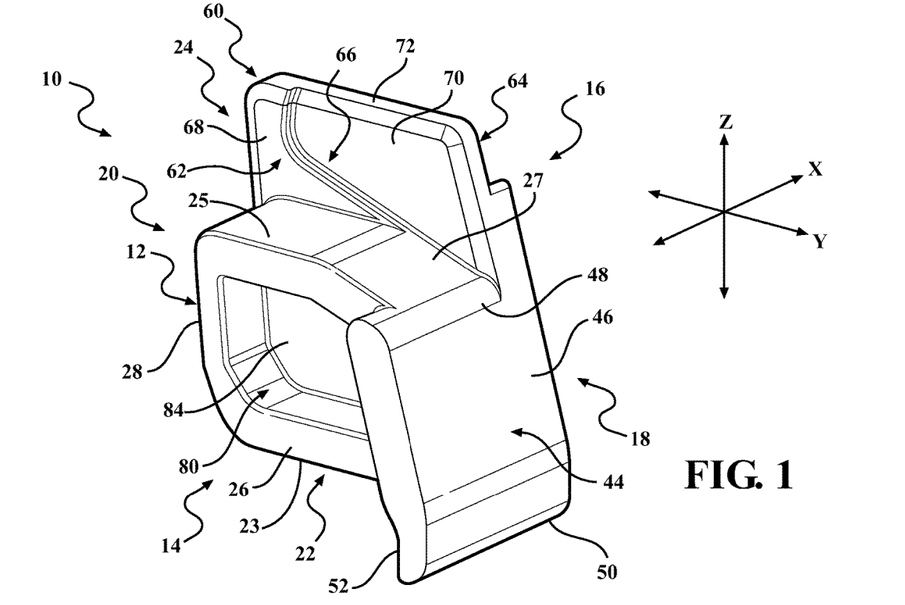
FIG. 1 is a view of one example of a seal plug.

A water management system can include a seal plug. FIG. 1 shows one example of a seal plug 10. The seal plug 10 can be made of any suitable material. For instance, the seal plug 10 can be made out of any suitable rubber material. In one or more arrangements, the seal plug 10 can be made of ethylene propylene diene monomer rubber (EPDM). The seal plug 10 can be made of a material with a low hardness to facilitate installation. For instance, the seal plug 10 can be made of a material with a hardness of from about 30 to about 50 (Shore A durometer).

The seal plug 10 can be made using any suitable process, including, for example, molding and/or material removal process. In one or more arrangements, the seal plug 10 can be formed as a single piece. In one or more arrangements, the seal plug 10 can be made of a plurality of separate pieces. The plurality of separate pieces can be joined together in any suitable manner, including, for example, adhesives and/or one or more fasteners.

The seal plug 10 can have a body 12. The body 12 can have any suitable size, shape, and/or configuration. For instance, the body 12 can include a first lateral side 14 and a second lateral side 16. The body 12 can include an outer side 18 and an inner side 20. The body 12 can include a lower side 22 and an upper side 24. The terms "inner", "outer", "upper", "lower", and "lateral" are used merely for convenience to facilitate the description with respect to the relative position of these are used in this respect with respect to the intended installation position of the seal plug 10. Therefore, it will be understood that these terms are not intended to be limiting. Also, for convenience of discussion, the seal plug 10 can have an associated longitudinal direction X, an associated lateral direction Y, and an associated elevation direction Z.

Figure 2:
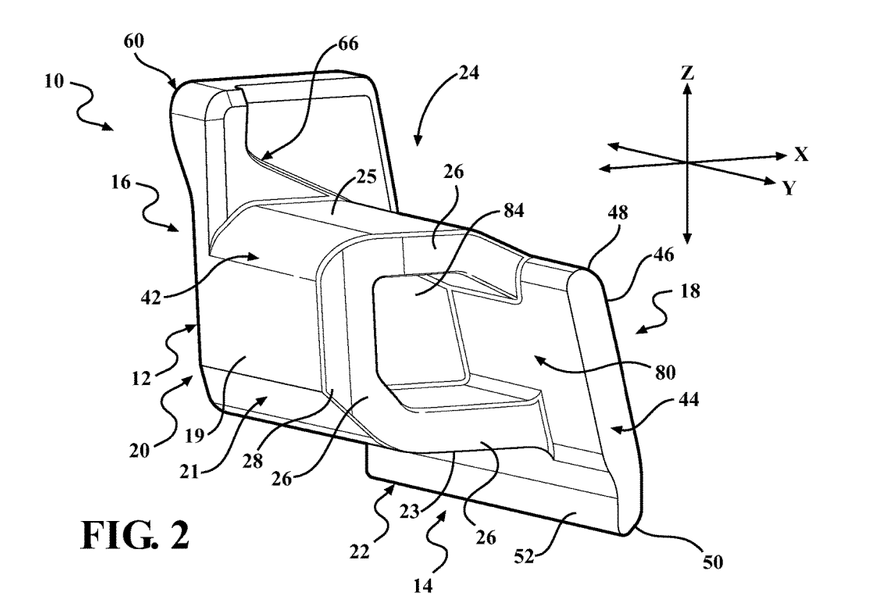
FIG. 2 is a view of the seal plug.

Referring to FIGS. 1 and 2, the first lateral side 14 can have any suitable configuration. For instance, at least a portion of the first lateral side 14 can be configured to engage a one or more vehicle structures, as will be described in detail herein. In one or more arrangements, at least a portion of the first lateral side 14 can be configured to sealingly engage and/or substantially matingly engage one or more vehicle structures. The first lateral side 14 can have any suitable configuration. For instance, the first lateral side 14 can include one or more sealing surfaces 26. The one or more sealing surfaces 26 can have any suitable size, shape, and/or configuration. For example, in the arrangements shown in FIGS. 1-2, the first lateral side 14 can be generally c-shaped.

In one or more arrangements, the one or more sealing surfaces 26 can be substantially planar and/or substantially flat. As used herein, the term "substantially" includes exactly the term it modifies and slight variations therefrom. Thus, the term "substantially planar" means exactly planar and slight variations therefrom. In this particular example, slight variations therefrom can include within normal manufacturing tolerances, within about 10 percent or less, within about 5 percent or less, within about 4 percent or less, within about 3 percent or less, within about 2 percent or less, or within about 1 percent or less. In one or more arrangements, at least a portion of one or more sealing surfaces 26 can be non-planar. For example, one or more sealing surfaces 26 can be curved. In one or more arrangements, the one or more sealing surfaces 26 can lie in substantially the same plane. However, in one or more other arrangements, at least one of a plurality of sealing surfaces 26 can be a different plane from the other sealing surfaces 26. In one or more arrangements, at least a portion of a sealing surface 26 can be in a different plane from the rest of the sealing surface 26. In one or more arrangements, the sealing surfaces 26 can be substantially parallel to each other.

In one or more arrangements, the first lateral side 14 can include one or more features to facilitate installation of the seal plug 10 on a vehicle. For instance, the first lateral side 14 can include one or more chamfers 28.

Figure 3:
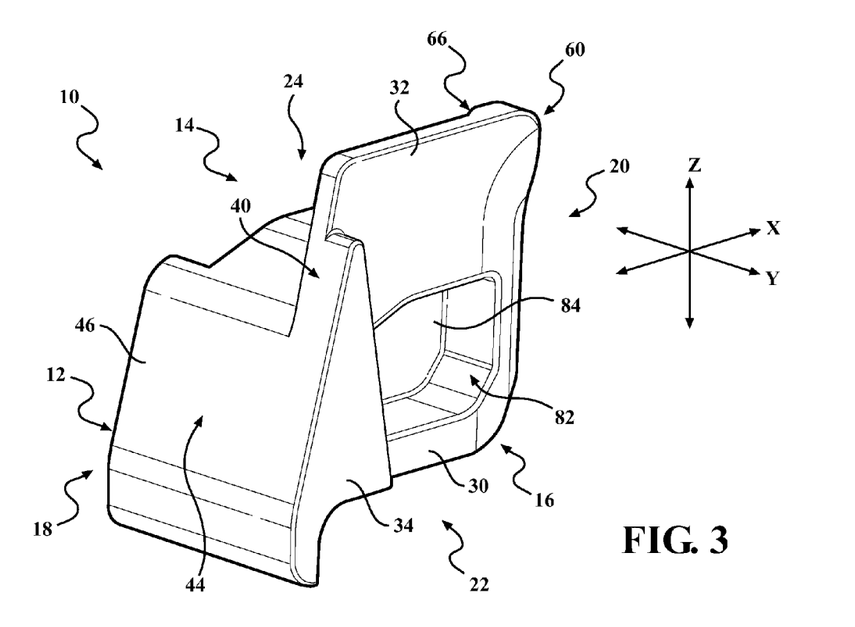
FIG. 3 is a view of the seal plug.
Figure 4:
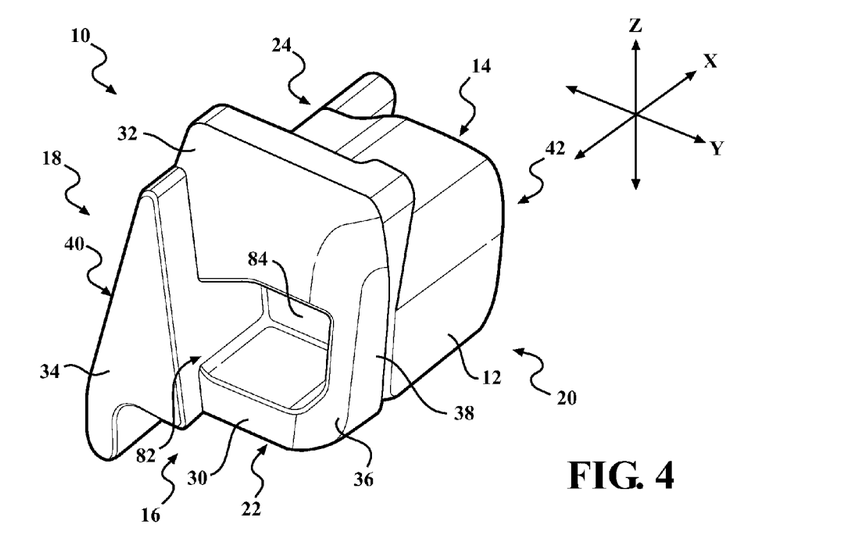
FIG. 4 is a view of the seal plug.

Referring to FIGS. 3-4, the seal plug 10 can have a second lateral side 16. The second lateral side 16 can be located on an opposite side of the body 12 from the first lateral side 14 in the longitudinal direction X. The second lateral side 16 can have any suitable configuration. For instance, the second lateral side 16 can be configured to engage one or more vehicle structures, as will be described in further detail herein. The second lateral side 16 can have any suitable configuration. For instance, the second lateral side 16 can include one or more sealing surfaces. In the example shown in FIGS. 3-4, the second lateral side 16 can have a plurality of sealing surfaces 30, 32, 34. The sealing surfaces 30, 32, 34 can have any suitable size, shape, and/or configuration.

In one or more arrangements, the one or more sealing surfaces of the second lateral side 16 can be substantially planar. In the arrangements shown in FIGS. 3-4, the sealing surface 30. At least a portion of the sealing surface 32 can be curved. More particularly, a lower region of sealing surface 32 can be substantially planar. In one or more arrangements, at least a portion of one or more sealing surfaces of the second lateral side 16 can be non-planar. For instance, in the arrangements shown in FIGS. 3-4, at least a portion of the sealing surface 34 can be curved. For example, an upper region of the sealing surface 34 can be curved.

In one or more arrangements, two or more of the plurality of sealing surfaces can lie in substantially the same plane. However, in one or more other arrangements, at least one of a plurality of sealing surfaces can be a different plane from the other sealing surfaces. In one or more arrangements, at least a portion of a sealing surface 30 can be in the same plane with at least a portion of the sealing surface 32. In one or more arrangements, the sealing surface 34 can in a different plane from the other of the sealing surface 30 and/or 32. In one or more arrangements, the sealing surface 34 can define the outermost portion of the second lateral side 16 in the lateral direction Y of the seal plug 10.

In one or more arrangements, two or more of the sealing surfaces can be substantially parallel to each other. For instance, in the arrangements shown in FIGS. 3-4, the sealing surface 32 can be substantially parallel to the sealing surface 30. The sealing surface 32 can be substantially parallel to a portion of the sealing surface 34.

In one or more arrangements, the second lateral side 16 can include one or more features to facilitate installation of the seal plug 10 on a vehicle. For instance, the second lateral side 16 can include one or more chamfers or other features. As an example, in the arrangements shown in FIGS. 3-4, the second lateral side 16 can include a first fillet 36 and a second fillet 38. The first fillet 36 and the second fillet 38 can be oriented at any suitable angle with respect to each other.

In some instances, the second lateral side 16 can have one or more features configured to facilitate positioning of the seal plug 10 with respect to a vehicle. As an example, the second lateral side 16 can include a stopper 40. The stopper 40 can have any suitable configuration. In one or more arrangements, the stopper 40 can extend generally in the lateral direction Y and/or the elevation direction Z. In one or more arrangements, the stopper 40 can define the sealing surface 34 and/or at least a portion of the recess 82.

As noted above, the seal plug 10 can include an inner side 20 and an outer side 18. The inner side 20 can have any suitable configuration. For instance, in one or more arrangements, the inner side 20 can be substantially flat and/or substantially planar, as is shown in FIGS. 2 and 4. The transition between the upper side 24 and the inner side 20 can have any suitable configuration. For instance, the transition between the upper side 24 and the inner side 20 can be configured to facilitate installation of the seal plug 10 on a vehicle. In one or more arrangements, the transition between the upper side 24 and the inner side 20 can be configured as a fillet 42 (FIGS. 2 and 4).

The outer side 18 can have any suitable configuration. For instance, the outer side 18 be configured to direct water away from the seal plug 10 or a vehicle on which the seal plug 10 is installed. In one or more arrangements, the outer side 18 can be configured as a water deflector 44. The water deflector 44 can be configured to slope downwardly in the elevation direction Z. The water deflector 44 can have any suitable configuration. For instance, the water deflector 44 can define one or more deflection surfaces. In one or more arrangements, the water deflector 44 can include a deflection surface 46. The water deflector 44 and/or the upper side 24 can be configured to direct water downwardly and away from the seal plug 10 and, therefore, and a vehicle in which the seal plug 10 is installed.

The water deflector 44 can include a proximal curved portion 48 and a distal curved portion 50. The proximal curved portion 48 can be located between the deflection surface 46 and the upper side 24 of the seal plug 10. The distal curved portion 50 can define the end of the water deflector 44. The distal curved portion 50 can extend beyond the lower side 22 in the elevation direction Z of the seal plug 10.

The water deflector 44 can extend beyond the sealing surfaces of the first lateral side. The extending portion of the water deflector 44 can define the stopper 40. The water deflector 44 can have an inner side 52. At least a portion of the inner side 52 can be configured to engage, substantially sealingly engage, and/or substantially matingly engage a vehicle structure.

The seal plug 10 can include a lower side 22. The lower side 22 can have any suitable configuration. The lower side 22 can include a lower surface 23. The lower surface 23 can be substantially flat and/or substantially planar. At least a portion of the lower surface 23 can be configured to engage, substantially sealingly engage, and/or substantially matingly engage a vehicle structure.

The inner side 20 can transition to the lower side 22 in any suitable manner. For instance, the inner side 20 can transition to the lower side 22 by a corner, a fillet, or a chamfer 21 (FIG. 2), just to name a few possibilities.

The seal plug 10 can include an upper side 24. The upper side 24 can have any suitable configuration. The upper side 24 can include a first surface 25 and a second surface 27. The first surface 25 can be substantially flat and/or substantially planar. In one or more arrangements, the first surface 25 can transition to the back surface 19 in any suitable manner. For instance, the first surface 25 can transition to the back surface 19 by a corner, a fillet 42 (FIG. 2), or a chamfer 21, just to name a few possibilities.

Figure 10:
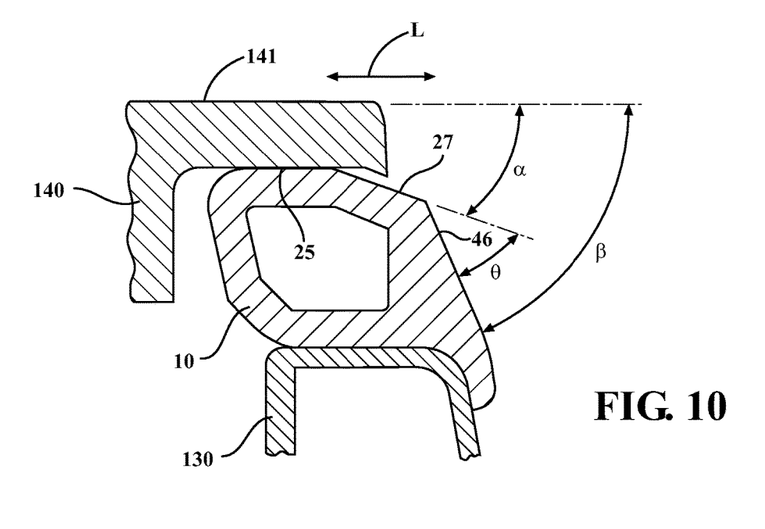
FIG. 10 is a cross-section view of a portion of a water management system.

The second surface 27 can be substantially flat and/or substantially planar. The first surface 25 can be angled relative to the second surface 27. An angle α (FIG. 10) can be formed between the first surface 25 and the second surface 27. While FIG. 10, shows the angle α as being formed between an upper surface 141 and the second surface 27, it will be understood that, in some arrangements, the first surface 25 can be substantially parallel to the upper surface 141. In such case, the angle α formed between the first surface 25 and the second surface 27 would be substantially the same as the angle formed between the upper surface 141 and the second surface 27. The angle α can be any suitable angle. In one or more arrangements, the angle α can be from about 10 degrees to about 30 degrees. In one or more arrangements, the angle α can be from about 15 degrees to about 25 degrees. In one or more arrangements, the angle α can be about 20 degrees. In one or more arrangements, the angle α can be about 19.9 degrees.

Referring to FIG. 10, an angle β can be formed between the first surface 25 and the deflection surface 46. While FIG. 10, shows the angle β as being formed between an upper surface 141 and the deflection surface 46, it will be understood that, in some arrangements, the first surface 25 can be substantially parallel to the upper surface 141. In such case, the angle β formed between the upper surface 141 and the deflection surface 46 would be substantially the same as the angle formed between the first surface 25 and the deflection surface 46. The angle β can be any suitable angle. In one or more arrangements, the angle β can be from about 50 degrees to about 80 degrees. In one or more arrangements, the angle β can be from about 60 degrees to about 70 degrees. In one or more arrangements, the angle β can be about 67.7 degrees.

An angle θ can be formed between the second surface 27 and the deflection surface 46. The angle θ can be any suitable angle. In one or more arrangements, the angle θ can be from about 30 degrees to about 50 degrees. In one or more arrangements, the angle θ can be from about 45 degrees to about 50 degrees. In one or more arrangements, the angle θ can be about 47.8 degrees.

The seal plug 10 can have an upper tab 60. The upper tab 60 can include an inner side 62 and an outer side 64. The upper tab 60 can have an upper surface 72. The upper tab 60 can have any suitable configuration. For instance, the outer side 64 of the upper tab 60 can define at least a portion of the sealing surface 32 of the second lateral side 16.

The inner side 62 of the upper tab 60 can include a sealing surface 68. The sealing surface 68 can be substantially planar and/or substantially flat. In one or more arrangements, the sealing surface 68, can be substantially parallel to the sealing surface 26. The inner side 62 can include a recessed surface 70 that is recessed from the sealing surface 68. The recessed surface 70 can be substantially planar and/or substantially flat. In one or more arrangements, the recessed surface 70 can be substantially parallel to the sealing surface 68.

The inner side 62 of the upper tab 60 can be configured to route water away from a vehicle. In one or more arrangements, the inner side 62 can include a water drainage channel 66. The water drainage channel 66 can have any suitable configuration. In one or more arrangements, the water drainage channel 66 can be generally sloped, angled, routed, and/or generally downward in the elevation direction Z. In one or more arrangements, the water drainage channel 66 can have a first end 76 and a second end 78. At the first end 76, the water drainage channel 66 can open to the upper surface 72 of the upper tab 60. At the second end 78, the water drainage channel 66 can open to the deflection surface 46 and/or the second surface 27.

In one or more arrangements, in going from the first end 76 to the second end 78, the water drainage channel 66 can include a first portion that extend generally in the elevation direction Z (e.g., a generally vertical direction). The first portion can transition to a second portion in which the water drainage channel 66 is angled downwardly relative to the first portion. There can be any suitable angle between the first portion and the second portion of the water drainage channel 66. As an example, the angle between the first portion and the second portion can be from about 100 degrees to about 150 degrees. For instance, the angle between the first portion and the second portion can be angled at about 95 degrees, about 100 degrees, about 105 degrees, about 110 degrees, about 115 degrees, or about 120 degrees relative to each other, just to name a few possibilities. In one or more arrangements, the second portion can extend substantially parallel to the second surface 27 of the upper side 24. In one or more arrangements, the second portion and the second surface 27 can extend at substantially the same angle relative to the first surface 25.

The water drainage channel 66 can have any suitable cross-sectional size, shape, and/or configuration. For instance, in one or more arrangements, the water drainage channel 66 can have a generally C-shaped cross-sectional shape or a U-shaped cross-sectional shape. In one or more arrangements, the cross-sectional size, shape, and/or configuration of the water drainage channel 66 can be substantially constant along its length. Alternatively, the cross-sectional size, shape, and/or configuration of the water drainage channel 66 can vary along at least a portion of the length of the water drainage channel 66.

In one or more arrangements, the seal plug 10 can include one or more recesses. The one or more recesses can have any suitable size, shape, and/or configuration. The recesses can be formed in any suitable manner. In one or more arrangements, the seal plug 10 can include a recess 80 that opens to the first lateral side 14 and/or a recess 82 that opens to the second lateral side 16. The recesses 80, 82 can extend to a depth within the body 12. In one or more arrangements, the recesses 80, 82 can terminate at and can be at least partially separated by a rib 84. The rib 84 can provide structural strength to the seal plug 10. The recesses 80, 82 can help to reduce the weight of the seal plug 10 and/or facilitate installation of the seal plug 10. As an example, the recesses 80, 82 can reduce friction for ease of assembly.

Figure 5:
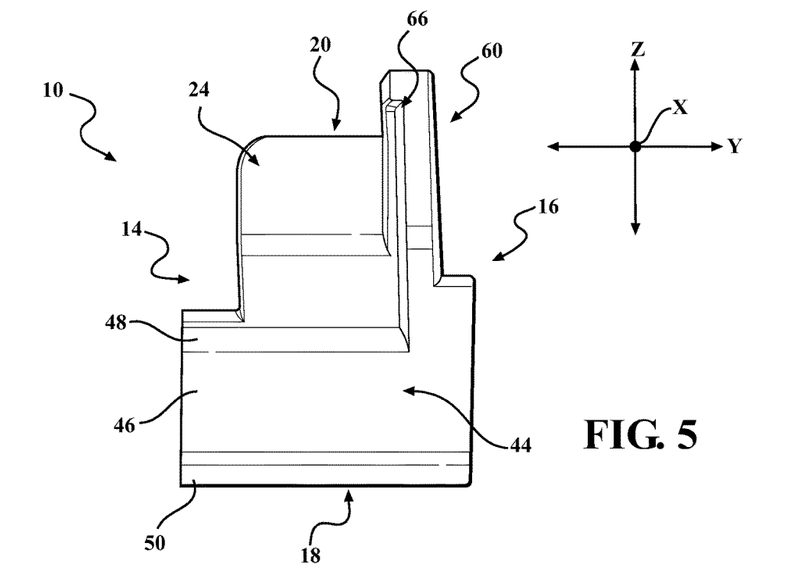
FIG. 5 is a view of the seal plug.

Now that the various aspects of the seal plug 10 have been described, one example of the environment in which the seal plug can be used will now be described with respect to FIG. 5. The seal plug 10 can be used in a vehicle. Referring to FIG. 5, an example of a portion of a vehicle 100 is shown. As used herein, "vehicle" means any form of motorized transport. In one or more implementations, the vehicle 100 can be an automobile. While arrangements will be described herein with respect to automobiles, it will be understood that embodiments are not limited to automobiles. In some implementations, the vehicle 100 may be a watercraft, an aircraft, a train, or any other form of motorized transport.

The vehicle 100 can include a bed 104. The bed 104 can be an open-top bed. The bed 104 can include an end 102, which can be a back end or a front end of the bed 104. In this context, the terms "front" and "back" can be used for convenience with respect to a longitudinal direction of the vehicle 100. The bed 104 can include a corner region 106, including a corner 108. It will be noted that, in the portion of the bed 104 shown in FIG. 5, the corner 108 can be a front corner of the bed 104. However, it will be understood that similar arrangements can be present on an opposite front corner and/or other corners (e.g., rear corners) of the bed 104. Thus, the structures described herein are equally applicable to any corner region or any other region of the bed 104.

As can be seen, a gap 110 can be formed between the structures at the end 102 of the bed 104. The gap 110 can be located in the corner region 106. The gap 110 can be located inboard of the corner 108.

Figure 6:
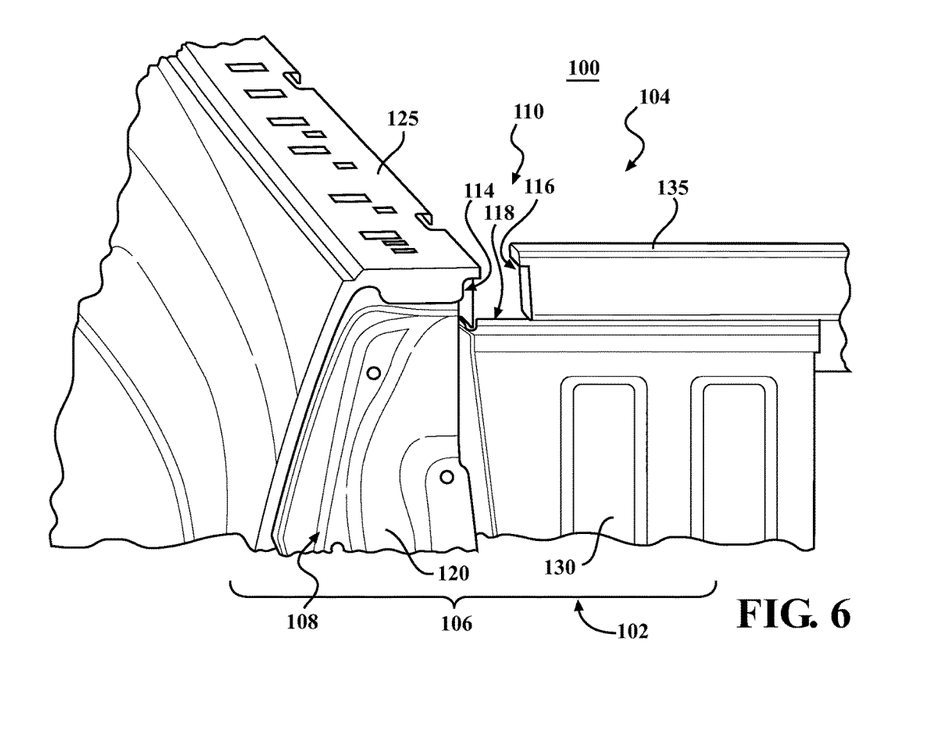
FIG. 6 is an example of a portion of an open-topped cargo bed of a vehicle.

The gap 110 can have any suitable configuration. In one or more arrangements, the gap 110 can be generally U-shaped, as is shown in FIG. 6. However, it will be understood that other configurations are possible.

The gap 110 can have a first lateral side 114, a second lateral side 116, and a bottom side 118. The first lateral side 114 of the gap 110 can be defined by one or more vehicle structures. For instance, in one or more arrangements, the first lateral side 114 can be defined by a deck side panel 120 and a deck side outer 125. The deck side panel 120 and the deck side outer 125 can be made of any suitable material, such as sheet metal.

The second lateral side 116 of the gap 110 can be defined by one or more vehicle structures. In one or more arrangements, the second lateral side 116 can be defined by a deck header 130 and/or a deck rail 135. The deck header 130 and the deck rail 135 can be made of any suitable material, such as sheet metal.

The bottom side 118 of the gap 110 can be defined by one or more vehicle structures. In one or more arrangements, the bottom side 118 can be defined by the deck header 130. In some instances, the deck header 130 can be movable between a closed position (shown in FIG. 6) and an open position (not shown).

The various components described herein can be assembled in any suitable manner. Various possible steps will now be described. The described steps may be applicable to the arrangements described above in relation to FIGS. 1-6, but it is understood that the steps can be carried out with other suitable systems and arrangements. Moreover, steps other than those described here can be included, and in fact, arrangements are not limited to including every step described. Further, while a particular chronological order may be described, arrangements described herein are not limited to any particular chronological order. Indeed, some of the steps may be performed in a different order than what is described and/or at least some of the described steps can occur simultaneously.

Figure 7:
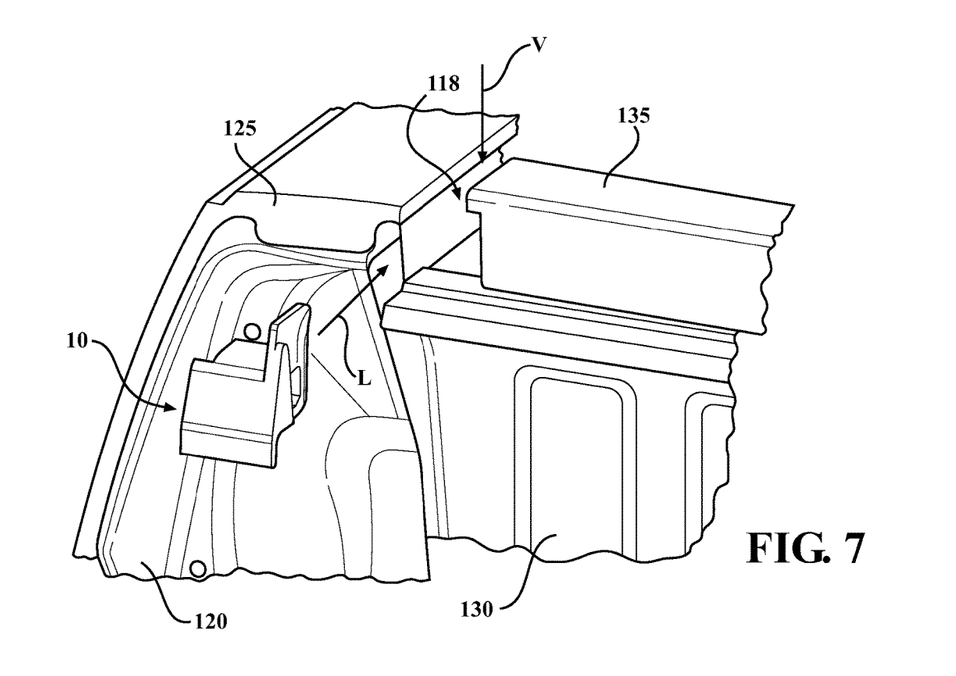
FIG. 7 is an example of the seal plug being inserted into a gap formed in a portion of the bed.

Referring to FIG. 7, the seal plug 10 can be inserted into the gap 110. As an example, the seal plug 10 can be moved toward the gap 110 from the exterior of the vehicle 100. The seal plug 10 can be pushed into the gap 110 using one or more fingers and/or one or more tools. The seal plug 10 can be inserted into the gap 110 from any suitable direction. For example, the seal plug 10 can be inserted, and/or moved into the gap 110 in the longitudinal direction L moving toward the front end of the vehicle 100. Alternatively or in addition, the seal plug 10 can be inserted, and/or moved into the gap 110 in a generally vertically downward direction V from above the gap 110.

Figure 8:
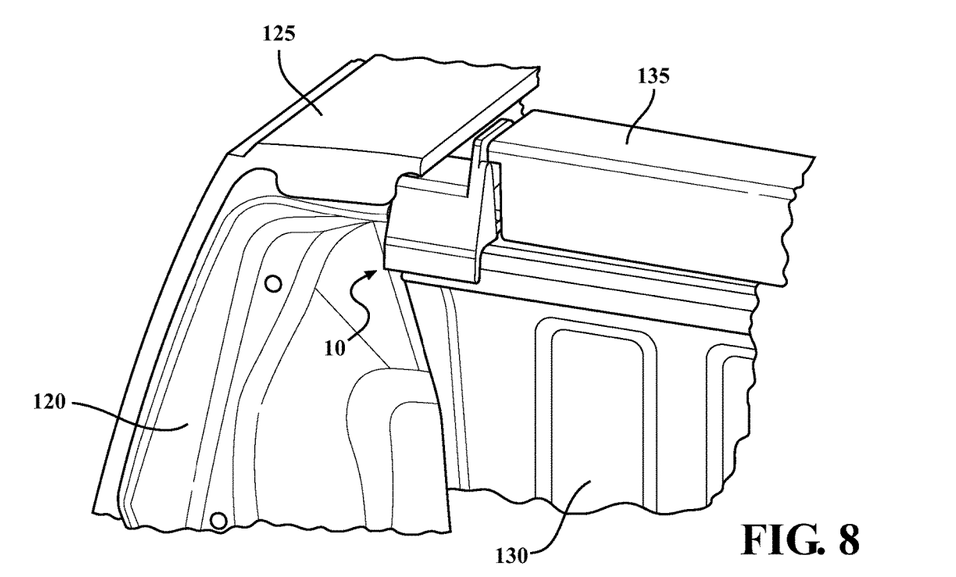
FIG. 8 is a close-up view of the bed, showing the seal plug received in the gap.

FIG. 8 shows an example of the seal plug 10 received in the gap 110. The lower side 22 of the seal plug 10 can engage or otherwise be supported on the deck header 130. In one or more arrangements, the lower side 22 of the seal plug 10 can substantially matingly engage the deck header 130. Alternatively or in addition, the lower side 22 of the seal plug 10 can sealingly engage the deck header 130.

Similar engagements can occur between at least a portion of the inner side 52 of the water deflector 44 and the deck header 130. The inner side 52 of the water deflector 44 can engage or otherwise be supported on the deck header 130. In one or more arrangements, the inner side 52 of the water deflector 44 can substantially matingly engage the deck header 130. Alternatively or in addition, the inner side 52 of the water deflector 44 can sealingly engage the deck header 130.

The first lateral side 14 of the seal plug 10 can engage the first lateral side 114 of the gap 110. In one or more arrangements, the first lateral side 14 of the seal plug 10 can sealingly engage the first lateral side 114 of the gap 110. In one or more arrangements, the first lateral side 14 of the seal plug 10 can engage the first lateral side 114 of the gap 110 by interference fit. For instance, the interference fit can be about 0.5 millimeters. It should be noted that, in some arrangements, the deck side outer 125 can be installed before the installation of the seal plug 10 within the gap 110. In other arrangements, the deck side outer 125 can be installed after the installation of the seal plug 10 within the gap 110.

The second lateral side 16 of the seal plug 10 can engage the second lateral side 116 of the gap 110. In one or more arrangements, the second lateral side 16 of the seal plug 10 can sealingly engage the second lateral side 116 of the gap 110. In one or more arrangements, the second lateral side 16 of the seal plug 10 can engage the second lateral side 116 of the gap 110 by interference fit. For instance, the interference fit can be about 0.5 millimeters.

In one or more arrangements, the deck top protector 140 can sealingly engage a portion (e.g., at least a portion of the sealing surface 68) of the upper tab 60 of the seal plug 10. In one or more arrangements, there can be an interference fit between the deck top protector 140 and a portion (e.g., at least a portion of the sealing surface 68) of the upper tab 60 of the seal plug 10. In one or more arrangements, the deck top protector 140 can sealingly engage the upper side 24 of the seal plug 10. In one or more arrangements, the deck top protector 140 can engage the upper side 24 of the seal plug 10 by interference fit. For instance, the interference fit can be about 0.5 millimeters.

In one or more arrangements, there can be additional forms of attachment between the seal plug 10 and one or more structures defining the gap 110 and/or the deck top protector 140. In some instances, the seal plug 10 can be attached to one or more structures defining the gap 110 and/or the deck top protector 140 by one or more adhesives. For example, the seal plug 10 can include an adhesive backing. In some arrangements, the seal plug 10 can attached to one or more structures defining the gap 110 and/or the deck top protector 140 by one or more fasteners (e.g., bolts, screws, pins, etc.).

Figure 9:
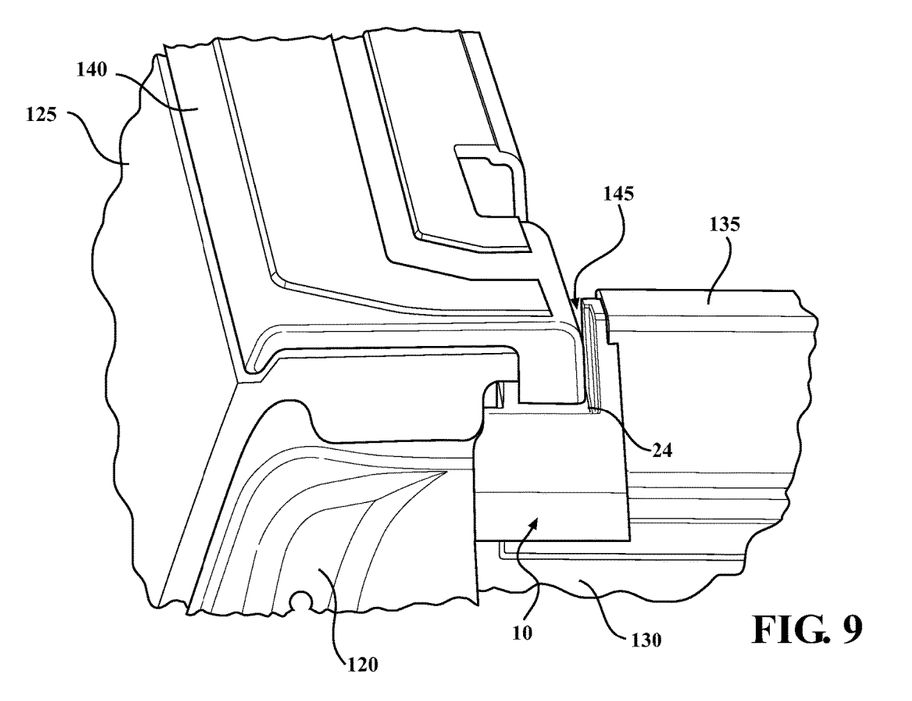
FIG. 9 is a close-up view of the bed, showing a deck top protector.

FIG. 9 shows an example of the installation of the deck top protector 140. The deck top protector 140 can be installed in any suitable manner. In one or more arrangements, a portion of the deck top protector 140 can directly contact the seal plug 10. In one or more arrangements, there can be a gap 145 between the deck top protector 140 and the upper tab 60 of the seal plug 10. The gap 145 can have any suitable side. In one or more arrangements, the gap 145 can be about 3.6 millimeters or less. In some arrangements, there may not be a gap between the deck top protector 140 and the upper tab 60 of the seal plug.

Figure 11:
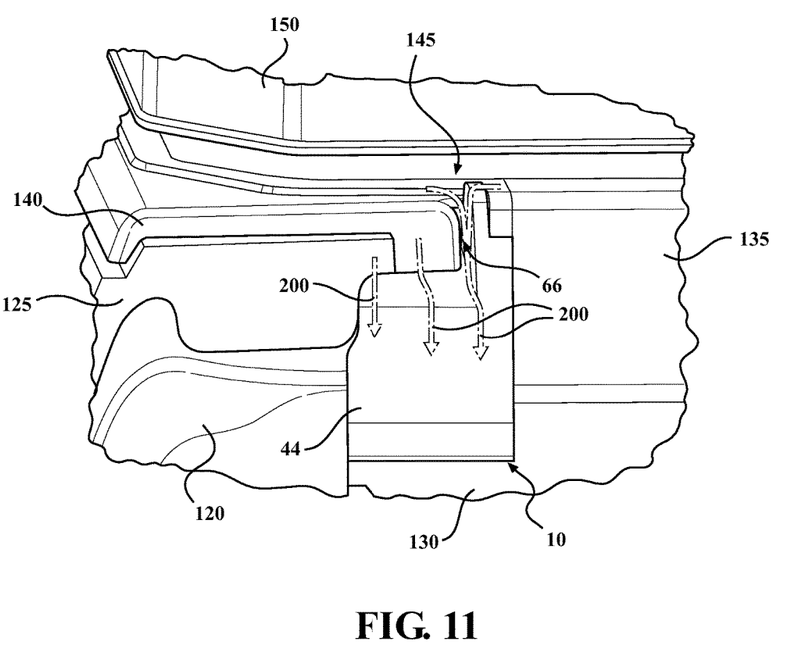
FIG. 11 is a view of the water management system.

A tonneau cover 150 can be installed, as is shown in FIG. 11, to cover the bed 104 of the vehicle 100. The tonneau cover 150 can be installed in any suitable manner. When installed, there can be any suitable relationship between the tonneau cover 150 and the seal plug 10. In one or more arrangements, there may be no contact between the tonneau cover 150 and the seal plug 10. In one or more arrangements, the tonneau cover 150 may contact the seal plug 10. As an example, the tonneau cover 150 may contact at least a portion of the upper tab 60 of the seal plug 10. More particularly, the tonneau cover 150 may contact at least a portion of the upper surface 72 of the upper tab 60.

Referring to FIG. 10, there can be various relationships between one or more features of the seal plug 10 and the other structures of the vehicle 100. For instance, in one or more arrangements, an upper surface 141 of the deck top protector 140 can be substantially parallel to the first surface 25 of the seal plug 10. An angle $\alpha$ can be formed between the upper surface 141 of the deck top protector 140 and the second surface 27 of the seal plug 10. The angle $\alpha$ can be any suitable angle. In one or more arrangements, the angle $\alpha$ can be from about 10 degrees to about 30 degrees. In one or more arrangements, the angle $\alpha$ can be from about 15 degrees to about 25 degrees. In one or more arrangements, the angle $\alpha$ can be about 20 degrees. In one or more arrangements, the angle $\alpha$ can be about 19.9 degrees.

In one or more arrangements, an upper surface of the tonneau cover 150 can be substantially parallel to the upper surface 141 of the deck top protector 140 and/or the first surface 25 of the seal plug 10. In such case, the angle between the upper surface of the tonneau cover 150 and the second surface 27 of the seal plug 10 can be substantially the same as angle $\alpha$.

Referring to FIG. 10, an angle $\beta$ can be formed between the upper surface 141 of the deck top protector 140 and the deflection surface 46. The above discussion of the angle $\beta$ is applicable here. In one or more arrangements, an upper surface of the tonneau cover 150 can be substantially parallel to the upper surface 141 of the deck top protector 140 and/or the first surface 25 of the seal plug 10. In such case, the angle between the upper surface of the tonneau cover 150 and the second surface 27 of the seal plug 10 can be substantially the same as the angle $\beta$.

It should be noted that the deflection surface 46 can be located outboard of the end of the deck top protector 140 in the longitudinal direction L. Further, the deck top protector 140 may overhang at least a portion of the second surface 27.

FIG. 11 shows examples of some of the ways in which the seal plug 10 can minimize water infiltration into the bed of the vehicle 100. During vehicle operation, it may rain or the vehicle 100 may otherwise be exposed to water (e.g., in a car wash, etc.). The seal plug 10 can physically impede water from infiltrating the gap 110. Further, the seal plug 10 can deflect water away from the vehicle 100. For instance, water can be diverted away from the vehicle 100 by one or more surfaces of the seal plug 10, such as the second surface 27 and the deflection surface 46. Such water may fall directly onto the seal plug 10, or it may spill onto the seal plug 10 from the deck top protector 140, the tonneau cover 150, and/or some other structure. Further, water that flows into the gap 145 between the upper tab 60 of the seal plug 10 and the deck top protector 140 can be directed to the water drainage channel 66. The water drainage channel 66 can, in turn, direct the water to the second surface 27 and/or the deflection surface 46.

It will be appreciated that arrangements described herein can provide numerous benefits, including one or more of the benefits mentioned herein. For example, arrangements described herein can minimize the infiltration of water, dirt, and/or other substances into the bed of the vehicle. Arrangements described herein can create a seal against neighboring vehicle structures to minimize water infiltration. Arrangements described herein can facilitate drainage of water away from the vehicle. In some five minute shower tests with the vehicle located on various surfaces (e.g., horizontal, left or right side elevated, back end elevated), water infiltration into the bed was reduced by at least 75% when a seal plug was installed on the vehicle compared to when the seal plug was not installed. Arrangements described herein can provide a configuration for a seal plug that can allow water drainage even when the vehicle is located on a sloped, angled, or inclined surface. Arrangements described herein can provide a seal plug that can be inserted into position with minimal assembly force exertion. In this way, repetitive task injuries of installation personnel can be minimized.

The terms "a" and "an," as used herein, are defined as one or more than one. The term "plurality," as used herein, is defined as two or more than two. The term "another," as used herein, is defined as at least a second or more. The terms "including" and/or "having," as used herein, are defined as comprising (i.e. open language). The phrase "at least one of . . . and . . . " as used herein refers to and encompasses any and all possible combinations of one or more of the associated listed items. As an example, the phrase "at least one of A, B and C" includes A only, B only, C only, or any combination thereof (e.g. AB, AC, BC or ABC).

Aspects herein can be embodied in other forms without departing from the spirit or essential attributes thereof. Accordingly, reference should be made to the following claims, rather than to the foregoing specification, as indicating the scope of the invention.

What is claimed is:

1. A seal plug comprising:
   a body including:
   an upper side including a first surface transitioning to a second surface, the second surface being angled downwardly relative to the first surface;
   a lower side located on an opposite side of the body from the upper side;
   a first lateral side, the first lateral side including one or more sealing surfaces configured to sealingly engage one or more vehicle components;
   a second lateral side located on an opposite side of the body from the first lateral side, the second lateral side including one or more sealing surfaces configured to sealingly engage one or more vehicle components;
   a deflector defining at least a portion of an outer side of the body, the deflector including a deflection surface, the deflection surface being angled downwardly relative to the first surface; and
   an upper tab extending above the first surface in an elevation direction, a water drainage channel being defined in an inner side of the upper tab, the water drainage channel including a first end and a second end, the first end opening to an upper surface of the upper tab, and the second end opening to at least one of the second surface and the deflection surface.

2. The seal plug of claim 1, wherein a first recess and a second recess are defined in the body, wherein the first recess opens to the first lateral side, wherein the second recess opens to the second lateral side, and wherein the first and second recesses are separated by a rib defined by the body.

3. The seal plug of claim 1, wherein the one or more sealing surfaces of the first lateral side are located substantially within the same plane.

4. The seal plug of claim 3, wherein the one or more sealing surfaces of the first lateral side form a substantially C-shaped configuration.

5. The seal plug of claim 1, wherein the one or more sealing surfaces of the second lateral side includes a plurality of sealing surfaces, and wherein at least one of the plurality of sealing surfaces of the second lateral side is offset from the rest of the plurality of sealing surfaces in a lateral direction.

6. The seal plug of claim 1, wherein the one or more sealing surfaces of the first lateral side include are substantially planar, and wherein at least one of the one or more sealing surfaces of the second lateral side is non-planar.

7. The seal plug of claim 1, wherein the deflection surface is angled downwardly relative to the second surface of the upper side.

8. The seal plug of claim 1, wherein the water drainage channel includes a first portion that includes the first end, wherein the first portion transitions to a second portion, wherein the second portion includes the second end, and wherein the second portion is angled downwardly relative to the first portion from about 100 degrees to about 150 degrees.

9. The seal plug of claim 1, wherein a portion of the deflector extends beyond the one or more sealing surfaces in a lateral direction, and wherein a portion of the deflector extends below the lower side in an elevation direction.

10. The seal plug of claim 1, wherein the deflector includes a distal curved portion, and wherein the deflection surface transitions into the distal curved portion.

11. A water management system for a vehicle, the system comprising:
    a plurality of vehicle components forming a portion of an open-top cargo bed of a vehicle, the plurality of vehicle components defining a gap, the gap including at least a first lateral side, a second lateral side, and a bottom side, the first lateral side being opposite to the second lateral side; and
    a seal plug received in the gap, the seal plug sealingly engaging the first lateral side and the second lateral side, and seal plug being supported on the bottom side of the gap, the seal plug including:
    an upper side including a first surface transitioning to a second surface, the second surface being angled downwardly relative to the first surface,
    a deflection surface, the deflection surface being angled downwardly and away from the first surface and from the plurality of vehicle components, and
    an upper tab extending above the first surface in an elevation direction, a water drainage channel being defined in an inner side of the upper tab, the water drainage channel including a first end and a second end, the first end opening to an upper surface of the upper tab, and the second end opening to at least one of the second surface and the deflection surface.

12. The system of claim 11, further including a deck top protector, wherein the deck top protector is attached to at least one of the plurality of vehicle components, and wherein the deck top protector includes a portion that directly engages the first surface of the upper side of the seal plug.

13. The system of claim 12, wherein the portion of the deck top protector faces the inner side of the upper tab in which the water drainage channel is defined.

14. The system of claim 12, wherein the deck top protector overhangs a portion of the second surface of the seal plug.

15. The system of claim 14, wherein an angle is defined between the second surface of the seal plug and an upper surface of the deck top protector, and wherein the angle is from about 10 degrees to about 30 degrees.

16. The system of claim 12, wherein an angle is defined between the deflection surface and an upper surface of the deck top protector, and wherein the angle is from about 60 degrees to about 70 degrees.

17. The system of claim 11, wherein an angle is defined between the second surface and the deflection surface, and wherein the angle is from about 40 degrees to about 50 degrees.

18. The system of claim 11, wherein the deflection surface is angled downwardly relative to the second surface of the upper side.

19. The system of claim 11, wherein the water drainage channel includes a first portion that includes the first end, wherein the first portion transitions to a second portion, wherein the second portion includes the second end, and wherein the second portion is angled downwardly relative to the first portion from about 100 degrees to about 150 degrees.

20. The system of claim 11, further including a tonneau cover operatively connected to the vehicle to cover the open-top cargo bed, and wherein the tonneau cover contacts at least a portion of the seal plug.

* * * * *